(12) United States Patent
Haller et al.

(10) Patent No.: US 9,663,001 B2
(45) Date of Patent: May 30, 2017

(54) UTILITY VEHICLE WITH LOCKABLE SLIDE PART

(71) Applicant: GRAMMER AG, Amberg (DE)

(72) Inventors: Erwin Haller, Birgland (DE); Nikolas Haller, Ammertal (DE)

(73) Assignee: Grammer AG, Amberg (DE)

(*) Notice: Subject to any disclaimer, the term of this patent is extended or adjusted under 35 U.S.C. 154(b) by 79 days.

(21) Appl. No.: 14/726,798

(22) Filed: Jun. 1, 2015

(65) Prior Publication Data
US 2016/0039315 A1  Feb. 11, 2016

(30) Foreign Application Priority Data
Jun. 3, 2014 (DE) .................. 10 2014 107 816

(51) Int. Cl.
| A47C 1/00 | (2006.01) |
| B60N 2/14 | (2006.01) |
| B60N 2/08 | (2006.01) |
| B60N 2/02 | (2006.01) |

(52) U.S. Cl.
CPC .............. B60N 2/146 (2013.01); B60N 2/08 (2013.01); *B60N 2002/022* (2013.01); *B60N 2002/0216* (2013.01)

(58) Field of Classification Search
CPC ..... B60N 2/146; B60N 2/08; B60N 2002/022
USPC ........... 297/344.22, 344.24, 344.21, 344.11; 248/425
See application file for complete search history.

(56) References Cited

U.S. PATENT DOCUMENTS

| 2,671,631 A | 3/1954 | Fox |
| 2,854,065 A | 9/1958 | Fox |
| 3,338,622 A | 8/1967 | Bachmann |
| 3,572,817 A | 3/1971 | Colautti et al. |
| 3,622,202 A | 11/1971 | Brown |
| 3,659,895 A | 5/1972 | Dresden |
| 3,860,283 A * | 1/1975 | Colautti ................. B61D 33/00 248/425 |
| 4,097,016 A | 6/1978 | Petrucci |
| 4,169,625 A | 10/1979 | Petersen |
| 4,316,631 A | 2/1982 | Lenz et al. |
| 4,330,160 A | 5/1982 | Stolz et al. |
| 4,344,597 A | 8/1982 | Eimen |
| 4,401,287 A | 8/1983 | Moeser |
| 4,477,050 A * | 10/1984 | Thompson ............. B60N 2/502 248/415 |

(Continued)

FOREIGN PATENT DOCUMENTS

| CA | 2337695 | 8/2001 |
| CN | 202480912 | 10/2012 |

(Continued)

OTHER PUBLICATIONS

Official Action for China Patent Application No. 201310683558.X, dated Oct. 11, 2016.

(Continued)

*Primary Examiner* — David R Dunn
*Assistant Examiner* — Alexander Harrison
(74) *Attorney, Agent, or Firm* — Sheridan Ross P.C.

(57) ABSTRACT

A commercial vehicle seat with a seat part, a backrest part and a seat substructure to be arranged on a body part of a commercial vehicle is provided. The seat substructure comprises a lateral swinging means with a cross carriage part, which can be swung transversely to the longitudinal extension of the commercial vehicle and by which at least the seat part is mounted, and comprises a locking means for fixing the cross carriage part on the base support part, wherein the locking means has two locking units which are spaced apart from one another in the longitudinal extension of the commercial vehicle and which have a respective locking element which is mounted such that it can swivel about a vertical swivel axis and can be deflected synchronously by an actuating element which is arranged at least in part therebetween.

12 Claims, 6 Drawing Sheets

(56) References Cited

U.S. PATENT DOCUMENTS

| | | |
|---|---|---|
| 4,570,997 A | 2/1986 | Tanizaki et al. |
| 4,588,314 A | 5/1986 | Anscher |
| 4,722,617 A | 2/1988 | Stella et al. |
| 4,792,188 A | 12/1988 | Kawashima |
| 4,834,452 A | 5/1989 | Goodrich |
| 4,971,392 A | 11/1990 | Young |
| 5,039,164 A | 8/1991 | Gibbs |
| 5,042,864 A | 8/1991 | Mochizuki |
| 5,161,765 A | 11/1992 | Wilson |
| 5,292,179 A | 3/1994 | Forget |
| 5,395,157 A | 3/1995 | Rollo et al. |
| 5,437,494 A | 8/1995 | Beauvais |
| 5,518,294 A | 5/1996 | Ligon et al. |
| 5,568,960 A | 10/1996 | Oleson et al. |
| 5,580,129 A | 12/1996 | Findlay |
| 5,690,385 A | 11/1997 | Feldman et al. |
| 5,704,729 A | 1/1998 | Carnahan et al. |
| 5,720,462 A | 2/1998 | Brodersen |
| 5,779,309 A | 7/1998 | Lu |
| 5,810,441 A * | 9/1998 | Ezuka ............... B60N 2/143 297/344.22 |
| 5,853,221 A | 12/1998 | Thoman et al. |
| 5,882,076 A | 3/1999 | Garelick et al. |
| 5,890,764 A * | 4/1999 | Lee .................. B60N 2/0232 248/349.1 |
| 5,906,441 A | 5/1999 | Seki |
| 5,941,498 A * | 8/1999 | Hoshihara ......... B60N 2/146 248/425 |
| 5,975,508 A | 11/1999 | Beard |
| 6,021,989 A | 2/2000 | Morita et al. |
| 6,079,786 A | 6/2000 | Kirkland et al. |
| 6,158,300 A | 12/2000 | Klingler |
| 6,164,722 A | 12/2000 | Mabey |
| 6,264,163 B1 | 7/2001 | Ivarsson |
| 6,325,456 B1 | 12/2001 | Carnahan |
| 6,402,114 B1 | 6/2002 | Carnahan et al. |
| 6,447,065 B1 | 9/2002 | Ropp |
| 6,557,919 B2 | 5/2003 | Suga et al. |
| 6,575,420 B2 | 6/2003 | Yoshida et al. |
| 6,722,737 B2 | 4/2004 | Kanai |
| 6,877,811 B1 | 4/2005 | Garelick |
| 7,036,883 B1 | 5/2006 | Thompson et al. |
| 7,108,325 B2 | 9/2006 | Williamson et al. |
| 7,121,608 B2 | 10/2006 | Billger et al. |
| 7,140,685 B2 | 11/2006 | Gardner |
| 7,328,952 B2 | 2/2008 | Guerrini |
| 7,506,932 B2 | 3/2009 | Bostrom et al. |
| 7,520,567 B2 | 4/2009 | Billger et al. |
| 7,575,206 B2 | 8/2009 | Meier |
| 7,600,732 B2 * | 10/2009 | Kennedy ........... B64D 11/0696 248/416 |
| 7,845,703 B2 | 12/2010 | Panzarella et al. |
| 7,950,740 B2 | 5/2011 | Bunea et al. |
| 8,033,589 B2 | 10/2011 | Kusanagi et al. |
| 8,485,600 B2 | 7/2013 | Forsman et al. |
| 8,602,495 B2 * | 12/2013 | Jeong ................ B60N 2/3013 297/334 |
| 8,783,772 B2 | 7/2014 | Schuler et al. |
| 9,073,463 B2 | 7/2015 | Kuriyama |
| 9,079,512 B2 | 7/2015 | Lehner |
| 9,085,245 B2 | 7/2015 | Haller |
| 2002/0130528 A1 | 9/2002 | Mans |
| 2002/0149250 A1 | 10/2002 | Silvia |
| 2002/0190560 A1 | 12/2002 | Kohl et al. |
| 2003/0189370 A1 | 10/2003 | Hemmer et al. |
| 2004/0066074 A1 | 4/2004 | Ovitt |
| 2004/0112659 A1 | 6/2004 | Kramer et al. |
| 2004/0188582 A1 | 9/2004 | Flynn et al. |
| 2004/0212242 A1 | 10/2004 | Gryp et al. |
| 2004/0232399 A1 | 11/2004 | Stone |
| 2006/0226685 A1 | 10/2006 | Priepke et al. |
| 2007/0196038 A1 | 8/2007 | Haepp |
| 2008/0031560 A1 | 2/2008 | Fukuda |
| 2008/0211284 A1 | 9/2008 | Mutou et al. |
| 2009/0102271 A1 | 4/2009 | Squires et al. |
| 2009/0284061 A1 | 11/2009 | Maier et al. |
| 2010/0001169 A1 | 1/2010 | Armo et al. |
| 2010/0117413 A1 | 5/2010 | Squires |
| 2010/0117428 A1 | 5/2010 | Deml et al. |
| 2010/0219009 A1 | 9/2010 | Turco et al. |
| 2010/0244420 A1 | 9/2010 | Scarf |
| 2011/0074198 A1 | 3/2011 | Iwasaki et al. |
| 2011/0163586 A1 | 7/2011 | Findlay |
| 2012/0237151 A1 | 9/2012 | Felis |
| 2012/0305347 A1 | 12/2012 | Mori et al. |
| 2013/0193729 A1 | 8/2013 | VanMiddendorp et al. |
| 2014/0167469 A1 | 6/2014 | Haller |
| 2014/0167470 A1 | 6/2014 | Lorey |
| 2014/0167471 A1 | 6/2014 | Haller |
| 2014/0167472 A1 | 6/2014 | Haller |
| 2014/0217796 A1 | 8/2014 | Haller |
| 2014/0339869 A1 | 11/2014 | Ott |
| 2015/0015039 A1 | 1/2015 | Brand et al. |
| 2015/0035334 A1 | 2/2015 | Roth et al. |
| 2016/0001685 A1 | 1/2016 | Ulrich et al. |

FOREIGN PATENT DOCUMENTS

| | | |
|---|---|---|
| CN | 103863146 | 6/2014 |
| DE | 1116987 | 11/1961 |
| DE | 1480465 | 1/1970 |
| DE | 2828503 | 1/1980 |
| DE | 3127625 | 6/1982 |
| DE | 32 18 379 A1 | 11/1983 |
| DE | 3708399 | 9/1987 |
| DE | 4415933 | 11/1994 |
| DE | 69202551 | 2/1996 |
| DE | 69721383 | 3/2004 |
| DE | 60118068 | 8/2006 |
| DE | 202006010184 | 9/2006 |
| DE | 102006037068 | 2/2008 |
| DE | 102007021141 | 9/2008 |
| DE | 102008058409 | 7/2009 |
| DE | 102010017328 | 12/2011 |
| DE | 1020100053752 | 6/2012 |
| DE | 102011009543 | 8/2012 |
| DE | 10 2012 112 525 A1 | 6/2014 |
| EP | 0515275 | 11/1992 |
| EP | 0921962 | 6/1999 |
| EP | 1659021 | 5/2006 |
| EP | 1824358 | 8/2007 |
| EP | 1924462 | 5/2008 |
| EP | 2213504 | 8/2010 |
| EP | 2293959 | 3/2011 |
| FR | 2201659 | 4/1974 |
| GB | 525663 | 9/1940 |
| GB | 2277494 | 11/1994 |
| JP | H06-316233 | 11/1994 |
| JP | H10-217811 | 8/1998 |
| JP | H11-198692 | 7/1999 |
| JP | 2002-211284 | 7/2002 |
| JP | 2002-306267 | 10/2002 |
| JP | 2003-063288 | 3/2003 |
| JP | 2004-203160 | 7/2004 |
| KR | 10-2013-0056092 | 5/2013 |
| WO | WO 2004/056605 | 7/2004 |
| WO | WO 2007/028473 | 3/2007 |
| WO | WO 2010/114966 | 10/2010 |

OTHER PUBLICATIONS

Search Report prepared by the German Patent Office for German Application No. 10 2014 107 816.0.
Official Action for Chinese Patent Application No. 201510379611.6, dated Feb. 27, 2017, 8 page.
Official Action for Chinese Patent Application No. 201510300342.X, dated Feb. 20, 2017, 6 page.

* cited by examiner

UTILITY VEHICLE WITH LOCKABLE SLIDE PART

The invention relates to a commercial vehicle seat with a seat part, a backrest part and a seat substructure to be arranged on a body part of a commercial vehicle, in which the seat substructure comprises a lateral swinging means with a cross carriage part, which can be swung transversely to the longitudinal extension of the commercial vehicle and by which at least the seat part is mounted such that it can swing on a base support part of the seat substructure transversely to the direction of travel, and comprises a locking means for fixing the cross carriage part on the base support part.

Generic commercial vehicle seats are already known from the prior art, the seating comfort for a passenger requiring improvement when travelling across difficult terrain by means of a transversely swingable cross carriage part. However, this swing function is not to be constantly activated because it can also be a hindrance, for example under normal road traffic conditions, for example when travelling relatively quickly around bends or the like, when the commercial vehicle seat is preferably required to hold the passenger in a stable manner. In this respect, appropriate locking means for fixing the cross carriage part to a stationary component of a seat substructure are also known for the commercial vehicle seat. A locking action is usually realised here in a rail-integrated manner in or respectively on cross rails of a lateral swinging means, by the aid of which the cross carriage part is guided on the stationary component. However, a major problem here is that due to the technically necessary play between a sliding rail element and a guiding rail element of the cross rails, a critical degree of freedom capable of rotating about a vertical axis frequently occurs, from which develops a sense of play, albeit it generally subjective in nature, as a result of which the commercial vehicle seat wobbles about the vertical axis. In this respect, suitable pawls of the locking means are coupled via relatively solid lever arms or via wire linkages, a number of articulated joints also being necessary between the individual components. These known solutions are correspondingly large in terms of their structure and also often require significant maintenance due to the large number of movable components. In addition, the large number of articulated components also causes an undesirable play in the entire locking means.

It is therefore the object of the present invention to further develop generic commercial vehicle seats such that at least the above-mentioned disadvantages are overcome.

This object is achieved according to the features of claim 1. The core idea of the invention is that in the case of a commercial vehicle seat with a seat part, a backrest part and a seat substructure to be arranged on a body part of a commercial vehicle, in which the seat substructure comprises a lateral swinging means with a cross carriage part, which can be swung transversely to the longitudinal extension of the commercial vehicle and by which at least the seat part is mounted such that it can swing on a base support part of the seat substructure transversely to the direction of travel, and comprises a locking means for fixing the cross carriage part on the base support part, the locking means has two locking units which are spaced apart from one other in the longitudinal extension of the commercial vehicle and which have a respective locking element which is mounted such that it can swivel about a vertical swivel axis and can be deflected synchronously by an actuating element which is arranged at least in part therebetween. The locking elements can thus be synchronously actuatable and are located in a horizontal plane between two cross rail units of the lateral swinging means. An advantage here is that the actuating element is arranged on the cross carriage part.

The locking elements can advantageously be synchronously deflected in that the actuating element is displaceable in the width direction of the vehicle seat in and counter to a displacement direction. Consequently, by pushing the actuating element in and out, the locking elements are deflected or swivelled respectively and thus either engage in bolts provided for this purpose or are disengaged therefrom to produce a locking or unlocking effect and thereby a double locking to fix the cross carriage part on the base support part.

The actuating element is advantageously provided with two curved portions and, wherein during a displacement movement of the actuating element, as described above, a first end of one of the locking elements can slide along each curved portion and a synchronous swivelling movement of the locking elements can be produced thereby. The locking elements which are preferably angled and flat can thus be simultaneously moved out and moved in again, for example by a spring loading, in that only the actuating element is pushed forwards and backwards and, during this movement, an interaction takes place between the curved portions of the actuating element and the ends of the locking elements. In this way, a double locking action can easily be produced by a simply formed actuating element. For this, only the actual actuating element with the two curved portions and an actuating element mount which is provided for this purpose and serves to guide the actuating element during the displacement movement are required. Spring elements can additionally be arranged as well as washers to improve the swivelling action of the locking elements.

With the proposed locking means, it is also possible to integrate the locking units, required for fixing the cross carriage part, into the substructure of the commercial vehicle seat simply in terms of construction and also while saving a great amount of space. This is particularly the case when the actuating element is also flat and is positioned in a plane with the angular, flat locking elements.

The present cross carriage part is a lateral horizontally displaceable horizontal cross carriage part, as a result of which in particular the seat part of the commercial vehicle seat is displaceable in a lateral horizontal manner. In this respect, the invention accordingly also relates to a lateral horizontally displaceable commercial vehicle seat.

Since the locking elements of the two locking units are spaced apart from one another in a horizontal plane, due to a double locking action, an extremely good play-free fixing of the swingable cross carriage part is also achieved, the locking elements swivelling in each case about a vertical swivel axis for locking and unlocking, and consequently being capable of being integrated into the seat substructure in a particularly flat construction. As a result, not only can a particularly loadable locking means be realised, but the entire seat height of the present commercial vehicle seat can be further reduced, which means that either more freedom of movement is available to a passenger or more installation space is available for other components of the commercial vehicle seat on the seat substructure.

In this respect, the present locking means within the meaning of the invention is also a double locking means with a double-lockable cross carriage part.

Here, it is also extremely advantageous that in particular the locking elements are arranged between two cross rail units of the lateral swinging means so that the entire installation space is optimally used for a reduction in the overall height of the seat substructure. In particular, it is advantageous that the locking elements in particular are not integrated into the cross rail units, so that said cross rail units can be of a relatively simple and flat configuration.

The two locking elements are ideally mounted in each case about a vertical swivel axis, as a result of which actuation can be realised more easily. Furthermore, in this respect, the necessary dimensions can be kept very small when the vertical swivel axes of the two locking elements are arranged together in a vertical plane extending in the longitudinal direction of the vehicle. In addition, the entire locking means can consequently be constructed symmetrically, which greatly simplifies the coupling of the locking elements in particular.

The two locking elements are thus configured as swivel hook plate elements, swivelable about the vertical swivel axis, so that for example with a basic body height of at least 10 mm or 5 mm, the height extension thereof is accordingly of a flat construction.

The locking elements can advantageously be configured such that they can be used in a mirror-inverted manner in the same embodiment for the respective other side. Therefore, the components of the left locking element and of the right locking element are the same, allowing the production costs to be greatly reduced.

Due to the actuating element according to the invention with its curved portions which interact with the ends of the locking elements, an outwards movement can take place in a very narrow installation space without any articulation between the locking elements and the actuating element.

The curved portions of the actuating element can be configured in many different shapes to move the respective locking element, for example out of a locking position into an unlocking position.

The two curved portions of the actuating element are advantageously configured in a mirrored form with respect to a longitudinal axis of the actuating element, which longitudinal axis corresponds to the displacement direction of the actuating element. This also advantageously means that the two curved elements result in a possible identical configuration of the locking elements, as a result of which the same components can thereby again be used on both sides and the production costs can be reduced.

Due to the flat and symmetrical formation of the actuating element, at least in respect of the curved portions, the locking means can be constructed extremely simply and can be accommodated in a space-saving manner in the seat substructure and particularly between the two cross rail units.

A contact-based guidance of the ends of the limb portions of the locking elements is only necessary here in the region of the curved portions of the actuating element. Thus, due to a reduction in friction surfaces in this respect, the locking means can also be actuated smoothly. Consequently, it is also possible to make reductions in terms of components and weight.

The locking means can be configured in a very compact and in particular very flat form if the locking elements, with these locking elements operatively connectable actuating elements and optionally swivel axes as well as optionally a manually operable actuating handle are arranged in a common horizontal plane.

When the manually operable actuating handle is actuated, the actuating element and the locking elements which are operatively connected thereto ideally move, for example by swivelling in and along a common horizontal plane or at least parallel thereto. The overall height of the seat substructure can be further reduced when the locking elements are arranged on the cross carriage part between two cross rail units of the lateral swinging means such that the height extension thereof is arranged in an installation space delimited by a lower imaginary horizontal plane spanned by the undersides of the mutually spaced apart cross rail units and by an upper imaginary horizontal plane spanned by the upper sides of the mutually spaced apart cross rail units.

The operational reliability of the present locking means can be improved when a resiliently deflectable and exclusively the actuating element which is displaceable along a displacement direction is spring preloaded. Of course, alternatively or in addition, any locking element can be spring preloaded by a spring element. Consequently, the actuating element is always tensioned and can thus be operated without play. A spring element in this respect can be effectively realised, for example by a screw spring element.

Furthermore, it is also advantageous, as already mentioned, when each of the locking elements is effectively arranged, spring preloaded, on the cross carriage part in the direction of a locking position. It is thereby possible to ensure a very operationally reliable locking effect, even if relatively great impacts, caused by driving situations, act on the commercial vehicle seat and particularly on the locking means. A suitable spring element can be incorporated into the mechanism in a particularly flatly constructed manner if it is a leg spring, a flat spiral spring or a leg spring element.

The pretensioning forces keeping the locking elements pretensioned ideally exceed the pretensioning forces which tighten the actuating element, so that the locking elements are automatically always held in the respective locking position.

Furthermore, an advantageous variant provides that the locking elements have a respective flat basic body in which a material recess is provided for catching into a locking bolt element of the locking means, the material recess being arranged in a longitudinal side of the basic body which is opposite a coupling side, defined by the actuating element, of the basic body.

The locking elements are ideally respectively coupled by the actuating element such that they are mounted on the cross carriage part so that they can swivel towards one another to unlock the locking means.

To realise the material recess and a coupling point for fastening the actuating element to the respective locking element, longitudinal sides or ends of the angular locking elements are advantageously selected, as better lever ratios can be achieved thereby with regard to the respective vertical swivel axis, but this does not necessarily mean that in a special case of use, a short side of the locking element cannot also be used.

While the locking elements are configured as swivel hook elements and/or as angular elements, it is consequently advantageous when a locking bolt element is allocated to each of the locking units which bolt element is arranged on the base support part.

A locking means configured in this manner can ensure that the actual locking components, such as the locking elements and the locking bolt elements corresponding thereto are effectively arranged directly on the cross carriage part or on the base support part respectively, which can produce an extremely robust locking action.

Further advantages, objectives and characteristics of the present invention will be described with reference to the accompanying drawings and in the following description, in which drawings a commercial vehicle seat with two locking units, arranged between two cross rail units, of a locking means is shown and described by way of example.

Figure 8:
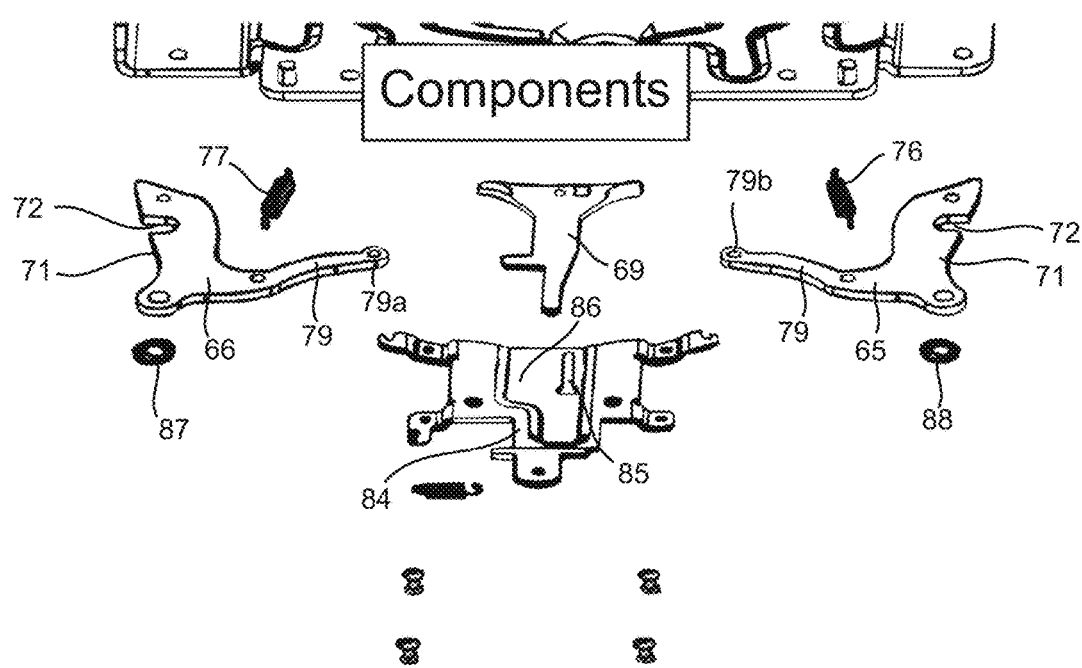
Figure 9:
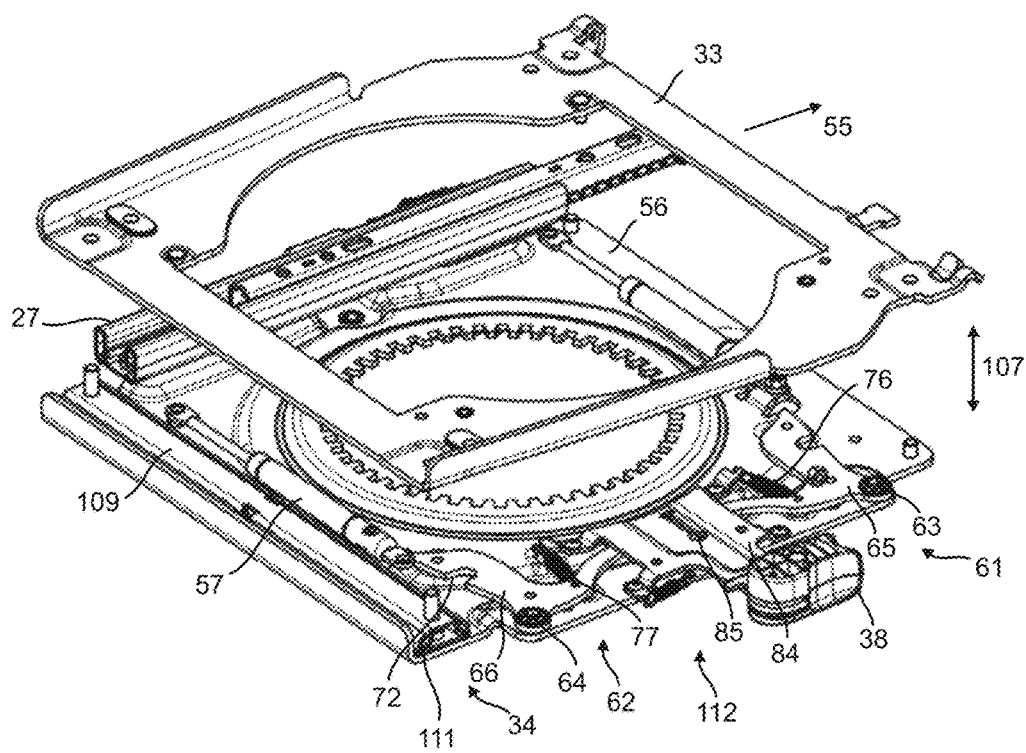
Figure 10:
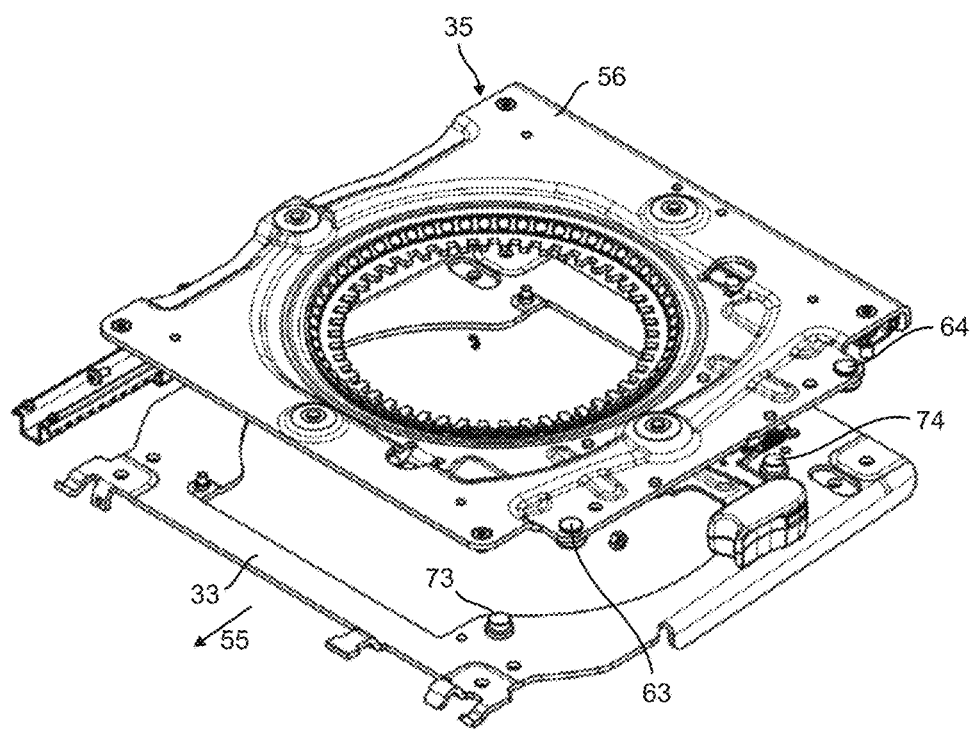

FIG. 8 schematically shows the individual components of the locking means including the actuating element;

FIG. 9 is a schematic perspective bottom view of a base support part and of the locking elements, arranged on the cross carriage part shown behind, of the present locking means;

FIG. 10 is a schematic perspective plan view of the cross carriage part and of the locking bolt elements, arranged on the base support part located behind, of the present locking means.

Figure 1:
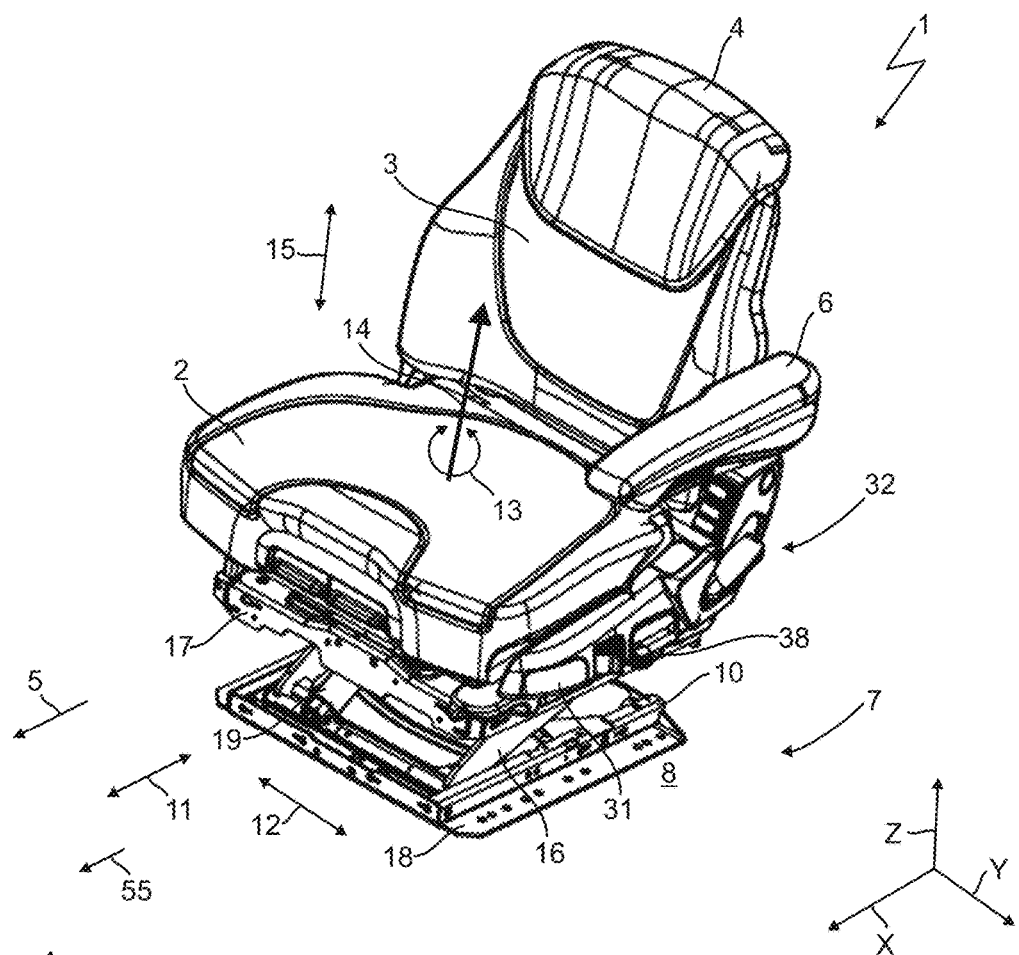
FIG. 1 is a schematic, perspective view of a commercial vehicle seat with a seat substructure comprising a horizontal movement device which has a lateral swinging means and a locking means therefore.

The commercial vehicle seat 1 shown in FIG. 1 comprises a seat part 2 for seating a passenger and a backrest part 3 for supporting the passenger's back. In this embodiment, the backrest part 3 is fitted with a headrest part 4. An armrest part 6 is also attached on the right-hand side to the backrest part 3, viewed in the forward direction of travel 5. Furthermore, the commercial vehicle seat 1 also comprises a seat substructure 7, by which the entire commercial vehicle seat 1 is attached to a body part 8, such as a cabin floor of a commercial vehicle cabin.

To adapt the commercial vehicle seat 1 in a versatile manner to the passenger's very diverse requirements of use and also to be able to offer the best possible seating comfort, in this embodiment the seat substructure 7 has a horizontal movement device 9 and a vertical movement device 10.

By means of the horizontal movement device 9, at least the seat part 2 and components connected thereto, for example the backrest part 3, can be moved in a translatory manner in longitudinal adjustment directions 11 (x-axis) and in a translatory manner in the lateral swinging direction 12 (y-axis) and also in a rotatory manner in rotation adjustment directions 13 about a vertical axis 14 (z-axis), as will be described in the following. In this embodiment, the horizontal movement device 9 only has a very small overall height of 57 mm due to the compact construction thereof.

By means of the vertical movement device 10, at least the seat part 2 and components connected thereto, such as the backrest part 3, can be moved in a translatory manner in vertical adjustment directions 15 with respect to the vertical axis. For this purpose, the vertical movement device 10 comprises a scissor-action frame 16 which is arranged between a cover plate 17 of the vertical movement device 10 and a base plate 18 of the vertical movement device 10 such that the horizontal movement device 9 is mounted in a vertically movable manner with respect to the base plate 18, wherein the cover plate 17 comprises the horizontal movement device 9. Furthermore, the vertical movement device 10 also comprises a damper-spring means 19 to cushion and dampen a vertical movement on the commercial vehicle seat 1 in the vertical direction 15.

Figure 2:
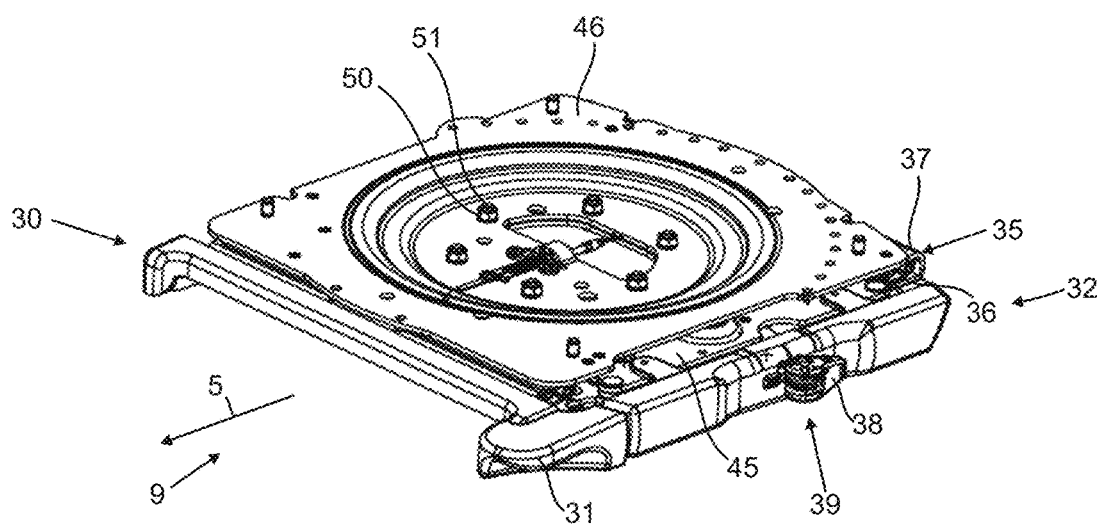
FIG. 2 is a schematic, perspective view of the horizontal movement device of the seat substructure of the commercial vehicle seat from FIG. 1.
Figure 3:
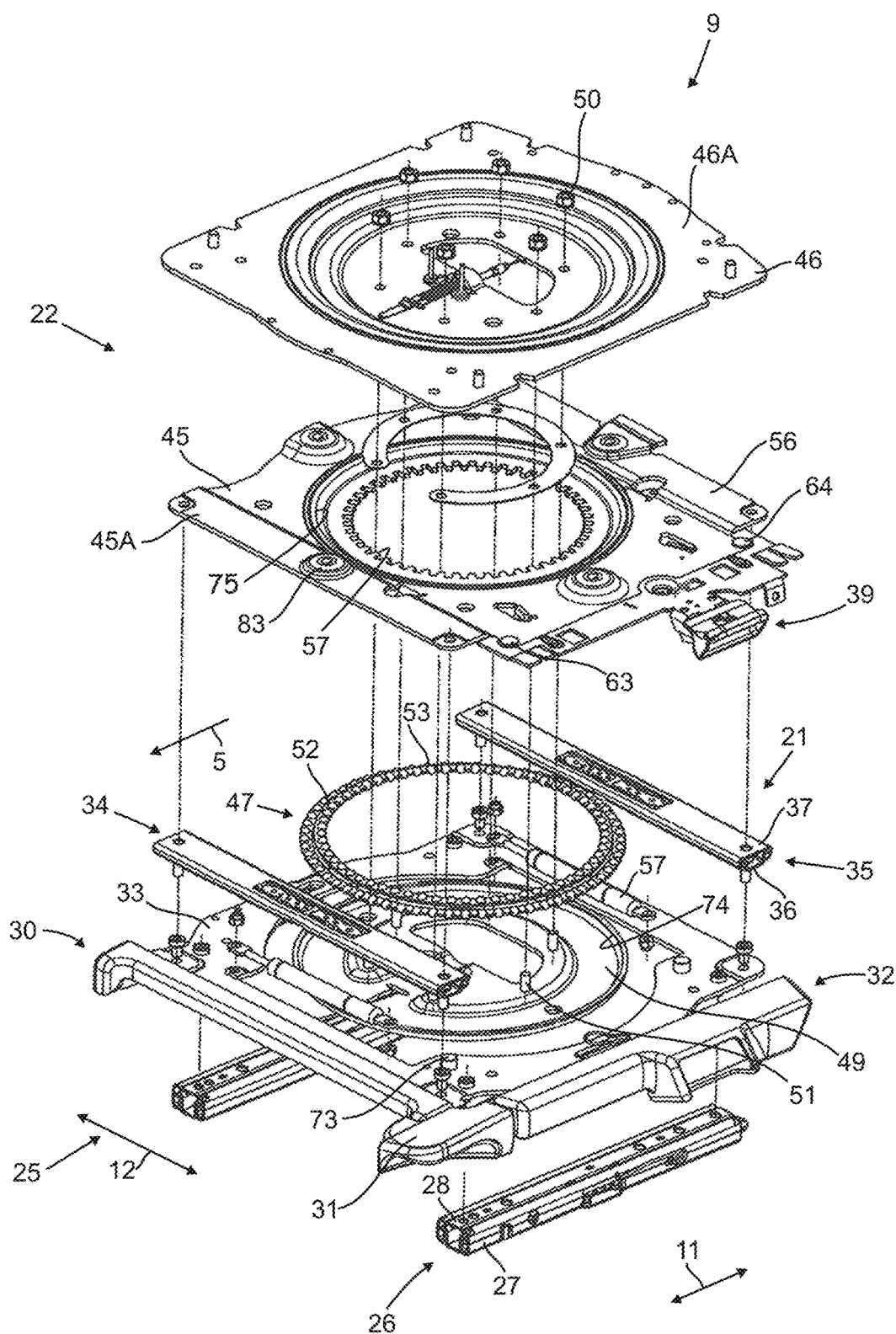
FIG. 3 is a schematic exploded view of the horizontal movement device from FIGS. 1 and 2.

The horizontal movement device 9, shown in more detail particularly in FIGS. 2 and 3, comprises a longitudinal adjustment means 20, a lateral swinging means 21 and a rotation adjustment means 22 to be able to move or respectively adjust the commercial vehicle seat 1 in the sense of the aforementioned longitudinal adjustment directions 11, lateral swinging directions 12 and rotation adjustment directions 13 respectively. In another equally advantageous embodiment, the horizontal movement device 9 can also only have one of the adjustment or swinging means 20, 21, 22 respectively or it can have any other combination thereof.

By means of the longitudinal adjustment means 20, a front longitudinal adjustment path of 120 mm and a rear longitudinal adjustment path of 90 mm, based on a neutral longitudinal position can be achieved, whereas by means of the lateral swinging means 21, a lateral swing path around a neutral longitudinal position of +/−25 mm can be achieved. By means of the rotation adjustment means 22, a respective swivel movement of 60° about the vertical axis 14 in 7.5° steps around a neutral rotational position and/or a 180° rotation can be achieved.

The longitudinal adjustment means L20 substantially comprises a right-hand longitudinal rail unit 25 and a left-hand longitudinal rail unit 26 (see FIG. 3), each of the longitudinal rail units 25, 26 comprising a guiding rail element 27 (numbered merely by way of example) and a sliding rail element 28 (also numbered merely by way of example). Here, the guiding rail element 27 is screwed on the cover plate 17 of the vertical movement device 10 and is thereby arranged above the vertical movement device 10 between said device 10 and the seat part 2.

Furthermore, in this embodiment, a double locking unit 30 by which the respective sliding rail element 28 can be locked on or unlocked from the corresponding guiding rail element 27 is allocated to the longitudinal adjustment means, so that the commercial vehicle seat 1 can be fixed or moved in the longitudinal adjustment means 11.

In order for the passenger to be able to manually actuate the double locking unit 30, the longitudinal adjustment means 11 comprises a manually operable handle element 31 which is arranged at the side next to the seat part 2 integrated into an actuating control 32 of the commercial vehicle seat 1.

The sliding rail elements 28 of the longitudinal rail units 25 and 26, the double locking unit 30 and also the manually operable handle element 31 with the mechanisms thereof are attached to a base support part 33 of the horizontal movement device 9, to which base support part 33 cross rail units 34, 35 of the lateral swinging means 21 are also attached. Each of the cross rail units 34 and 35 has a guiding rail cross element 36 and a sliding rail cross element 37 to allow a movement in the lateral adjustment direction 12. In this embodiment, the longitudinal adjustment means 20 is arranged under the lateral swinging means 21 so that it is positioned between the lateral swinging means 21 and the vertical movement device 10.

The respective guiding rail cross element 36 is thus screwed together with the base support part 33, whereas the sliding rail cross element 37 guided accordingly on the guiding rail cross element 36 is respectively arranged on a lower casing part 45.

In this embodiment, the lower casing part 45 belongs to the rotation adjustment means 22 and forms with a correspondingly formed double-layered upper casing part 46 a mounting for a rolling body bearing unit 47 which is realised in this embodiment by a ball bearing unit. On the underside, the ball bearing unit 47 is completed and protected by a cover element 49 which forms the second part of the double-layered upper casing part 46 and by which the lower casing part 45, the upper casing part 46 and thereby also the ball bearing unit 47 of the rotation adjustment means 22 are braced. For this purpose, nuts 50 are screwed together with corresponding threaded bolts 51 of the cover element 49.

Furthermore, the lower casing part 45 forms a torque-proof fixed casing part 45A of the rotation adjustment means 22 which is integrated into the seat substructure 7 in a torque-proof manner, whereas the present double-layered upper casing part 46 correspondingly forms a rotating casing part 46A which is rotatable with respect to the fixed casing part 45A and which, by means of the cover element 49, is mounted on the fixed casing part 45A such that it can rotate about the vertical axis 14 by two ball rim parts 52, 53 of the ball bearing unit 47.

To enable at least the seat part 2 of the preliminary commercial vehicle seat 1 to swing transversely to the travel direction 5 and thereby also transversely to the longitudinal extension 55 of the commercial vehicle, the lateral swinging means 21 is further characterized by a cross carriage part 65 which can swing transversely to the longitudinal extension 55 of the commercial vehicle and the swinging motion of which can be damped by damper 57. This cross carriage part 56 is guided correspondingly by the two mutually spaced apart cross rail units 34 and 35 with respect to the base support part 33.

Furthermore, the commercial vehicle seat 1 also has a locking means 60 which is shown in more detail in FIGS. 4 to 8 and by which the cross carriage part 56 can be fixed directly on the base support part 33, should a swing function not be required. According to the invention, the locking means 60 shown, moreover, in more detail in FIGS. 4 to 8 for fixing or releasing the lateral swinging means 21 has two locking units 61 and 62 which are arranged spaced apart from one another in the longitudinal extension 55 of the commercial vehicle, with a respective locking elements 65 and 66 mounted such that they can swivel about a vertical swivel axis 63 and 64 respectively.

These locking elements 65, 66 are configured as angular lever elements, which will be described in more detail below.

Figure 4:
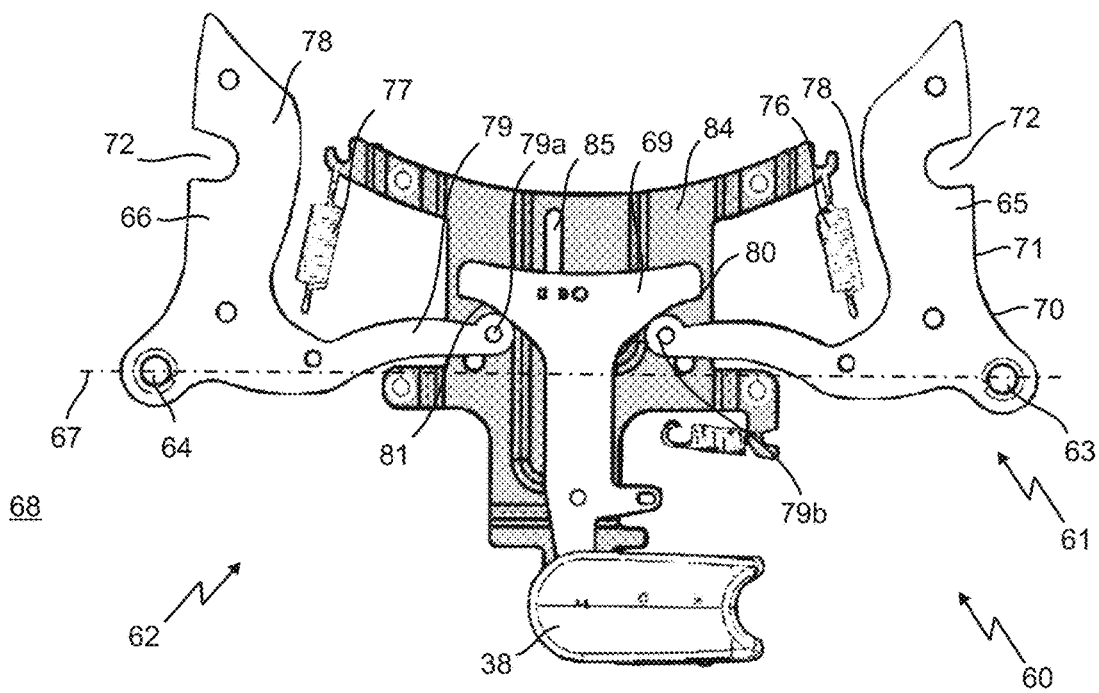
FIGS. 4 and 5 are a schematic plan view and a bottom view of the locking means including actuating element in the unlocked state.

The two vertical swivel axes 63, 64 are arranged so as to extend parallel to one another in a common vertical plane 67 (shown merely by way of example in FIG. 4).

This vertical plane 67 extends vertically to a horizontal plane 68 in which the two locking elements 65, 66 are swiveably arranged, this horizontal plane 68 coinciding with the plane of the paper according to the drawing in FIG. 4.

The term "horizontal plane" in the context of the present invention is understood as meaning that this plane extends in the width direction of the vehicle and in the longitudinal direction 55 of the vehicle and is only oriented horizontally when the commercial vehicle is positioned on horizontally oriented ground. Otherwise, this plane inclines with an inclination of the entire commercial vehicle according to the width direction and longitudinal direction of the vehicle. The same applies with respect to the vertical plane 67.

The two locking elements are moved about the respective vertical swivel axis 62, 63 by a common actuating element 69 arranged at least in part between said locking elements and are deflected thereby. The actuating element in a displacement direction 82, as shown in FIG. 7, is pushed inwards, i.e. forwards (FIGS. 6 and 7) or backwards (FIGS. 4 and 5) and the locking elements are deflected thereby.

Thus, the two locking elements 65 and 66 are arranged in a synchronously actuatable and in an extraordinarily space-saving manner in the horizontal plane 68 between the two cross rail units 34 and 35 of the lateral swinging means 21.

For this purpose, the two locking elements 65, 66 are each produced from flat basic body plates 70 approximately 5 mm thick or high respectively (numbered merely by way of example, see FIG. 4-8), so that there is easily enough space for them between the two cross rail units 34 and 35.

Figure 6:
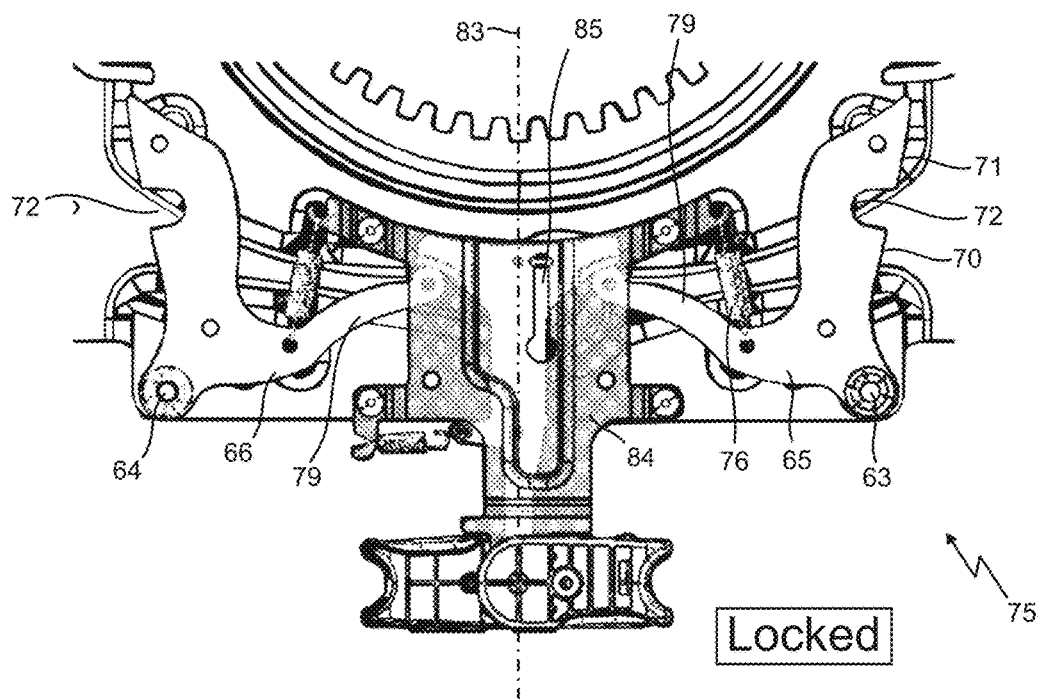
FIGS. 6 and 7 are a schematic plan view and a bottom view of a locking means in the locked state.
Figure 7:
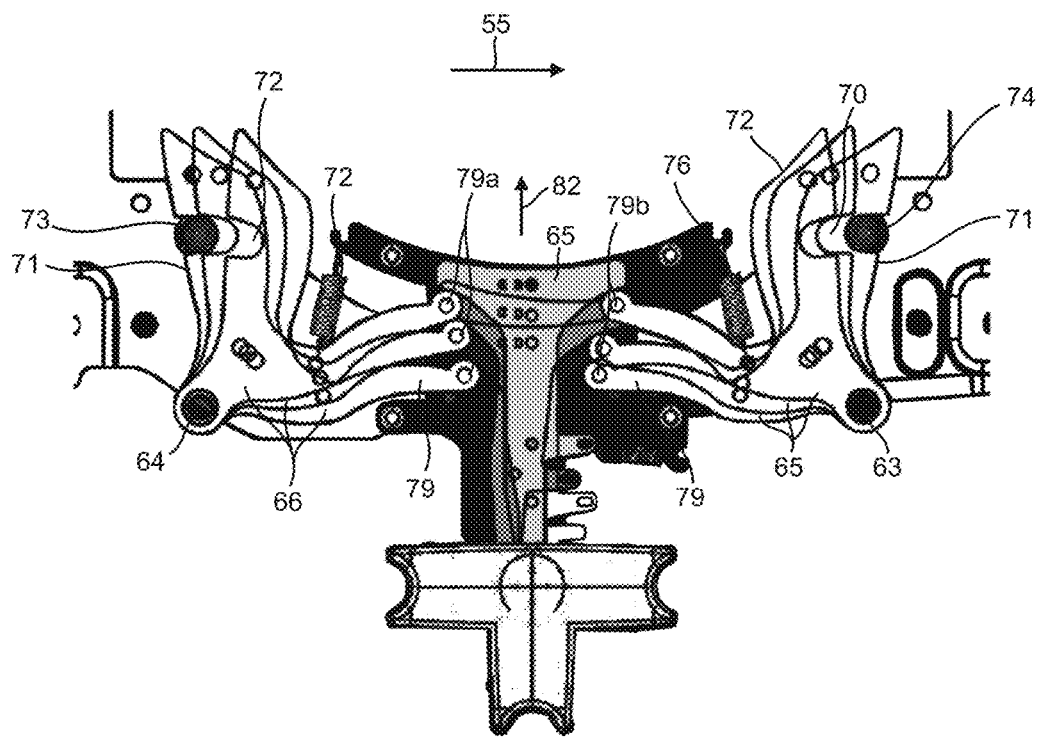

Furthermore, the basic body plates 70 of the two locking elements 65 and 66 are respectively configured angularly with the limb portions 79 facing the actuating elements, and provided on a first side 71 of the respective further limb portion of each locking element is a respective material recess 72 by which each of the locking elements 65, 66 is snapped into a corresponding locking bolt element 73, 74 of the locking means 60 when said locking means 60 and thereby also the lateral swinging means 21 are in a locking position 75 (cf. FIGS. 6 and 7).

In order that the locking elements 65, 66 are always able to snap into the locking bolt element 73, 74 in an operationally reliable manner, each of the locking units 61, 62 comprises a spiral spring element 76, 77.

While the respective material recess 72 is made in the respective first side 71 of the locking elements 65, 66, curved formations for stabilising the locking element are provided on a side 78 opposite side 71.

Thus, side 71 is to be considered as the locking side and the limb portion 79 is to be considered as the deflection limb portion of the locking element.

Figure 5:
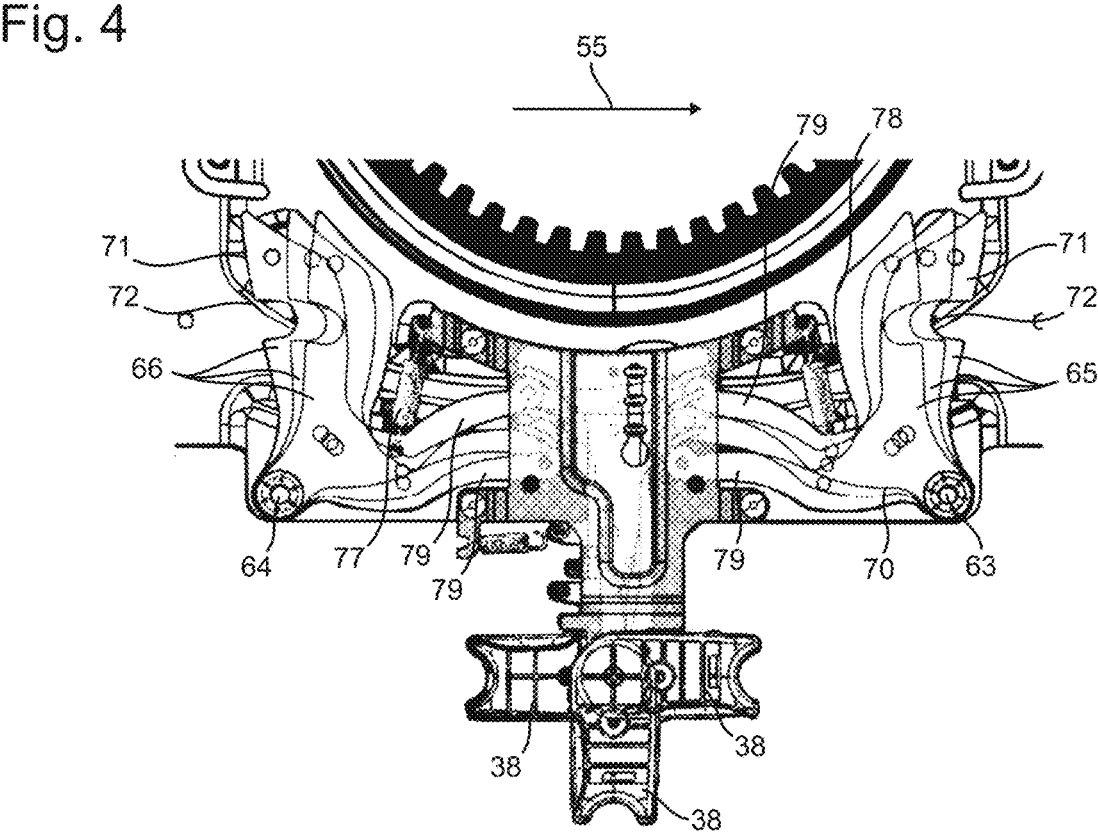

FIGS. 4 and 5 are a plan view and a bottom view respectively of the locking means. These drawings show an unlocked state. This means that the actuating element 69 has been moved momentarily into the retracted state, i.e. directed away from the centre of the seat, more specifically counter to a displacement direction 82, as shown in FIG. 7.

For this purpose, the actuating element 69 is guided inside an actuating element mount or a corresponding displacement holding element 84 which, when viewing the displacement means shown in individual parts in FIG. 8, is presented as a guide element which has, in addition to a slotted recess 85 for guiding the actuating element during the displacement movement, a depression 86 within which the actuating element 69 can be introduced to save space.

If the actuating element is pulled outwards from inside, i.e. if it is moved downwards from above in FIG. 5, as can be realised by various positions of the manual actuating lever 38, the pawl or the angular locking element 65, 66 respectively is unlocked by the swivelling thereof about the axes 63, 64. This takes place in that the end regions or end portions 79a, 79b respectively of the limb portions 79 of the locking elements 65, 66 slide along the curved portions 80, 81 of the actuating element 69 and as a result, the end regions 79a, 79b are drawn downwards, viewed in the image plane. As a result, a swivelling movement will take place, as shown in three different positions in FIG. 5. This movement takes place against a spring force arising from the two spring elements 76 and 77. The spring force always causes the locking elements 65, 66 to tend to go into a locking position as long as this is not counteracted by the actuating element 69.

On the other hand, FIGS. 6 and 7 are a plan view and a bottom view of the locking means in a locked position. The three different positions of the locking elements 65, 66 shown in FIG. 7 show the locking elements catching or engaging respectively by their recesses 72 into the bolts 73 and 74 to produce a locking effect. This also takes place by means of the spring elements 76, 77, a displacement movement of the actuating element 69 along the displacement direction 82 being essential for this movement.

As can also be clearly seen in FIGS. 4 to 8, it is advantageous if the slot 85 and the guide bolt, guided therein, of the actuating element 69 are positioned eccentrically with respect to the longitudinal axis 83. In this respect, the actuating element 69 comprises on both sides oblique and/or curved and ascending surfaces, as a result of which during a movement out of a locking position, the deflection movement of the locking elements 65, 66 is increased.

Due to the eccentric positioning of the slot 85 and of the guide bolt, it is possible, particularly during a backwards movement, i.e. during an unlocking procedure, for a locking element 66 to have a more advantageous force progression or distance progression respectively due to the circular course of the actuating lever, thereby allowing an easier unlocking procedure. In addition, this eccentric position improves the secure positioning of the locking element.

An additional spring fitted on the side of the actuating element 69 can contribute to holding the locking and unlocking system more effectively in the end positions.

The individual parts shown in FIG. 8 clearly show that only few parts are required for an innovative locking means of this type. A simple and economical production is thus possible. Furthermore, the locking elements 65, 66 can be formed in an identical manner so that the same component can be used for both sides, i.e. for the left-hand side and for the right-hand side.

As can be seen in particular from the drawing according to FIG. 8, the locking elements 65, 66 are arranged in a particularly space-saving manner on the cross carriage part 65 between the two cross rail units 34, 35 of the lateral swinging means 21 such that the respective height extension 107 thereof is arranged in an installation space 112 delimited by a lower imaginary horizontal plane (not shown here) spanned by the undersides 108, 109 of the mutually spaced apart cross rail units 34, 35 and by an upper imaginary horizontal plane (not shown) spanned by the upper sides 110, 111 of the mutually spaced apart cross rail units 34, 35.

As can be clearly seen particularly in a drawing of the horizontal movement device in a bottom view according to FIG. 9, the locking elements 65, 66 are arranged in a particularly space-saving manner on the cross carriage part 21 between the first cross rail unit 34 and the second cross rail unit 35 (not shown here) of the lateral swinging means such that the respective height extension thereof is arranged in an installation space 112 delimited by a lower imaginary horizontal plane (not shown here) spanned by the undersides of the mutually spaced apart cross rail units 34 and 35 and by an upper imaginary horizontal plane (not shown here) spanned by the upper sides 110 and 111 of the mutually spaced apart cross rail units 34 and 35.

FIG. 10 is a plan view of the horizontal movement device.

Depending on whether the commercial vehicle seat 1 is a vehicle seat or a front passenger seat, the construction, in particular the seat substructure 7 can also be configured in a mirror-inverted manner in respect of the x-axis, that is the actuating control 32 and in particular the manually operable handle element 31 and the manually operable actuating handle 38 can be arranged on the right-hand side of the commercial vehicle seat instead of on the left-hand side.

All the features disclosed in the application documents are claimed as being essential to the invention, provided that, individually or in combination, they are novel over the prior art.

LIST OF REFERENCE SIGNS 1 commercial vehicle seat
2 seat part
3 backrest part
4 headrest part
5 forwards direction of travel
6 armrest part
7 seat substructure
8 body part
9 horizontal movement device
10 vertical movement device
11 longitudinal adjustment means
12 lateral swinging directions
13 rotation adjustment directions
14 vertical axis
15 vertical adjustment directions
16 scissor-action frame
17 cover plate
18 base plate
19 damper-spring means
20 longitudinal adjustment means
21 lateral swinging means
22 rotation adjustment means
25 right-hand longitudinal rail unit
26 left-hand longitudinal rail unit
27 guiding rail unit
28 sliding rail unit
30 double locking unit
31 handle element
32 actuating control
33 base support part
34 front cross rail unit
35 rear cross rail unit
36 guiding rail cross element
37 sliding rail cross element
38 manually operable actuating handle
45 lower casing part
45A fixed casing part
46 upper casing part
46A rotating casing part
47 rolling body bearing unit
49 cover element
50 nut
51 threaded bolt
52 first ball rim part
53 second ball rim part
55 longitudinal extension of the commercial vehicle
56 cross carriage part
57 damper
60 locking means
61 first locking unit
62 second locking unit
63 first vertical swivel axis
64 second vertical swivel axis
65 first locking element
66 second locking element
67 vertical plane
68 horizontal plane
69 actuating element
70 basic body plates
71 first side
72 material recess
73 first locking bolt element
74 second locking bolt element
75 locking position
76 first spring element 77 second spring element
78 second side
79 limb element
79A end of the limb element
79B end of the limb element
80 curved portion
81 curved portion
82 displacement direction
83 longitudinal axis
84 actuating element mount
85 slot
86 depression
87 washer
88 washer
107 height extension
108 underside of the front cross rail unit
109 underside of the rear cross rail unit
110 upper side of the front cross rail unit
111 upper side of the rear cross rail unit
112 installation space

What is claimed is:

1. A commercial vehicle seat with a seat part, a backrest part and a seat substructure to be arranged on a body part of a commercial vehicle, in which the seat substructure comprises a lateral swinging means with a cross carriage part, which can be swung transversely to a longitudinal extension of the commercial vehicle and by which at least the seat part is mounted such that it can swing on a base support part of the seat substructure transversely to a direction of travel, and comprises a locking means for fixing the cross carriage part on the base support part, wherein the locking means has two locking units which are spaced apart from one another in the longitudinal extension of the commercial vehicle and which have a respective locking element which is mounted such that it can swivel about a vertical swivel axis and can be deflected synchronously by an actuating element which is arranged at least in part therebetween, wherein the actuating element is displaceable, the actuating element having two curved portions and during a displacement movement of the actuating element, a respective first end of one of the locking elements can slide along each curved portion and a swivelling movement of the locking element can be produced thereby.

2. The commercial vehicle seat according to claim 1, wherein the synchronously actuatable locking elements are arranged in a horizontal plane between two cross rail units of the lateral swinging means.

3. The commercial vehicle seat according to claim 1, wherein the actuating element is arranged on the cross carriage part.

4. The commercial vehicle seat according to claim 1, wherein the actuating element is displaceable in a width direction of the vehicle seat in and counter to a displacement direction.

5. The commercial vehicle seat according to claim 1, wherein the two curved portions are configured in a mirrored form with respect to a longitudinal axis which corresponds to a displacement direction of the actuating element.

6. The commercial vehicle seat according to claim 1, wherein the locking elements and the actuating element are arranged in a common horizontal plane.

7. The commercial vehicle seat according to claim 1, wherein the locking elements are arranged on the cross carriage part between two mutually spaced apart cross rail units of the lateral swinging means such that a height extension thereof is arranged in an installation space delimited by a lower imaginary horizontal plane spanned by undersides of the mutually spaced apart cross rail units and by an upper imaginary horizontal plane spanned by upper sides of the mutually spaced apart cross rail units.

8. The commercial vehicle seat according to claim 1, wherein the vertical swivel axes of the two locking elements are arranged together in a vertical plane extending in the longitudinal direction of the vehicle.

9. The commercial vehicle seat according to claim 1, wherein each of the locking elements is effectively arranged spring preloaded with a spring element on the cross carriage part in a direction of a locking position.

10. The commercial vehicle seat according to claim 1, wherein the locking elements have a respective flat basic body in which a material recess is provided for catching into a locking bolt element of the locking means, the material recess being arranged in a long side of the basic body, which side is opposite a coupling side, defined by the actuating element, of the basic body.

11. The commercial vehicle seat according to claim 1, wherein allocated to each of the locking units is a locking bolt element which is arranged on the base support part.

12. A commercial vehicle seat with a seat part, a backrest part and a seat substructure to be arranged on a body part of a commercial vehicle, in which the seat substructure comprises a lateral swinging means with a cross carriage part, which can be swung transversely to a longitudinal extension of the commercial vehicle and by which at least the seat part is mounted such that it can swing on a base support part of the seat substructure transversely to a direction of travel, and comprises a locking means for fixing the cross carriage part on the base support part, wherein the locking means has two locking units which are spaced apart from one another in the longitudinal extension of the commercial vehicle and which have a respective locking element which is mounted such that it can swivel about a vertical swivel axis and can be deflected synchronously by an actuating element which is arranged at least in part therebetween, and wherein the locking elements have a respective flat basic body in which a material recess is provided for catching into a locking bolt element of the locking means, the material recess being arranged in a long side of the basic body, which side is opposite a coupling side, defined by the actuating element, of the basic body.

* * * * *